United States Patent [19]

Leshik

[11] 4,307,117

[45] Dec. 22, 1981

[54] STABILIZED CURCUMIN COLORANT

[75] Inventor: Richard R. Leshik, Magnolia, Del.

[73] Assignee: General Foods Corporation, White Plains, N.Y.

[21] Appl. No.: 134,610

[22] Filed: Mar. 27, 1980

[51] Int. Cl.$^3$ .................... A23L 1/272; A23L 1/221

[52] U.S. Cl. .................................. 426/96; 426/103; 426/250; 426/540; 426/268; 426/578; 426/579; 426/316; 426/302; 426/650

[58] Field of Search ............... 426/250, 540, 268, 316, 426/602, 103, 426, 650, 96, 302, 578, 579

[56] References Cited

U.S. PATENT DOCUMENTS

| | | | |
|---|---|---|---|
| 2,385,412 | 9/1945 | Hall | 426/268 |
| 3,433,643 | 3/1969 | Tatter et al. | 426/426 |
| 3,664,963 | 5/1972 | Pasin | 252/316 |
| 3,764,346 | 10/1973 | Noznick et al. | 426/96 |
| 3,906,116 | 9/1975 | Quesnel et al. | 426/602 |
| 3,949,096 | 4/1976 | Johnson et al. | 426/302 |
| 3,985,913 | 10/1976 | Johnson et al. | 426/650 |
| 4,138,212 | 2/1979 | Stransky | 8/80 |
| 4,163,803 | 8/1979 | Goldscher | 426/250 |
| 4,187,323 | 2/1980 | Gidlow | 426/540 |

*Primary Examiner*—Jeanette M. Hunter
*Attorney, Agent, or Firm*—Mitchell D. Bittman

[57] ABSTRACT

The present invention stabilizes curcumin against color changes by maintaining the curcumin itself at low, stable pH values, while not upsetting the pH balance of a dry food mix which may be placed in contact therewith. Preferably, the pH of the curcumin is maintained at a value within the range of from about 3.5 to about 4.5, and comprises a spray-dried intimate mixture of curcumin, an organic acid, a buffer, a dispersant for the curcumin, and a film-forming encapsulant. A preferred use of the colorant is in dry mixes for instant puddings which are alkaline due to the salts employed to cause setting.

34 Claims, No Drawings

STABILIZED CURCUMIN COLORANT

TECHNICAL FIELD

The present invention relates to food colorants, and particularly to a stable yellow colorant based on curcumin, a dry food mix employing it and a process for preparing it.

Curcumin is the active coloring principal found in the rhizome of *Curcuma longa* L. and has been identified chemically as diferuloylmethane. It has a bright yellow to orange-yellow hue at acid pH values, but loses its color under alkaline conditions. Commercially, it is available as turmeric, which is the ground rhizome itself (1 to 3% curcumin), and oleoresin turmeric, which is the oilsoluble portion extracted from the rhizome. The oleoresin turmeric can be purified by one, two or more extractions to purities ranging from 30 to 99%. It is apparent, however, that regardless of the form or purity of the curcumin as available to the prior art, the curcumin is not suitable for use in many products because it loses its color upon storage at alkaline conditions.

Many products are available as dry mixes which require the use of alkaline components for proper preparation. Principal among these are instant pudding mixes which are mixed with cold milk to thicken and set. These puddings typically employ alkaline phosphate salts, such as alkali metal pyrophosphates and orthophosphates, to effect the set. When these dry mixes contact curcumin, they destabilize it, making it lose its desired yellow hue. And, the mixes themselves cannot be acidified because this would affect their ability to set up.

BACKGROUND ART

Curcumin, in addition to its use as a colorant, is also useful as a flavor, depending upon the variety of the plant and the method of preparation. In U.S. Pat. No. 3,906,116 to Quesnel et al, it is disclosed that flavor oleoresins, such as oleoresin turmeric, can be microencapsulated at high flavor levels by spray drying an emulsion where the oleoresin forms the dispersed phase and an aqueous emulsion stabilizer solution comprises the continuous phase. While the patent mentions stability, the product is primarily meant for flavoring, and pHstable colors are not provided.

In U.S. Pat. No. 2,385,412, Hall relates his solution to a problem encountered in the manufacture of dry seasoning compositions containing the oleoresin capsicum. He found that acid conditions, caused by a carrier such as sodium chloride or corn syrup, would result in a gradual bleaching of the color. To correct this, he suggested wetting the carriers with an alkaline buffer solution of the capsicum. Tests in the application show a reduced pH change, but this requires coating all of the carrier with the buffer solution.

In U.S. Pat. No. 4,163,803, Goldscher discusses the use of turmeric to both flavor and color acid foods, but does not identify a method for making a pH-stable colorant. The disclosed improvement relates to the elimination of a bitter note in turmeric by the addition of glycine.

In U.S. Pat. No. 4,138,212, Stransky discloses that washing ground turmeric root in a soap solution extracts curcumin in water-soluble form and in increased yields. It is indicated that this alkaline form is more color-stable than conventional polysorbate water-soluble prepared by the prior art alcohol extraction procedure. An oil soluble form is prepared by precipitating the curcumin by adding an acid, while yet maintaining an alkaline pH. There is no disclosure herein of a dry product suitable for use in dry mixes and which is stable in contact with acid as well as alkaline mixes.

There remains a need for a storage stable, dry curcumin colorant which can be employed in small amounts in dry food mixes, regardless of the pH of the mix, to provide food products with a pleasing yellow coloration.

DISCLOSURE OF THE INVENTION

The present invention provides a stabilized dry yellow colorant based on curcumin which is stable under storage conditions in the presence of dry food mixes regardless of pH. Also provided are a method of preparing the colorant, and an improved dry food mix containing it.

The colorant in its broad aspects comprises a dry powder containing curcumin and an amount of an acid effective to maintain the curcumin at a pH of less than 6.

The improved dry food mix has a pH of greater than 6, comprises a yellow colorant and dry food ingredients, and is adapted for storage for long periods of time in dry form and then mixing with an aqueous liquid in the preparation of a yellow-colored food product, wherein the improvement comprises: a stabilized yellow colorant in dry powder form which contains curcumin and an amount of an acid effective to maintain the curcumin at a pH of less than 6.

The method of the invention is an improved method for preparing a dry curcumin colorant by dispersing the curcumin in an aqueous film-forming solution and drying the solution, wherein the improvement comprises: adding an amount of an acid to the solution to reduce the pH thereof to below 6, to thereby render the colorant stable to dry food mixes of any pH.

The term curcumin is used herein to mean the pure compound diferuloylmethane, or any of those structurally similar compounds encompassed by the term as understood by those skilled in the art. The curcumin can be natural or synthetic, and it can be present in any degree of purity wherein it retains its characteristic coloring characteristics. Among the impurities can be carriers and solubilizing agents added in commercial grades, and the insoluble vegetable matter of the turmeric rhizome itself. Thus, in addition to the pure compound, the curcumin can be employed in what the art refers to as soluble turmeric, as well as in the form of oleoresin turmeric or the pulverized rhizome of turmeric itself. Where the oleoresin turmeric is employed, it can have any desired degree of commercial purity and can be what is referred to as single extract turmeric or multiple extract turmeric (e.g. extraction with solvents such as ethylene dichloride, acetone or alchohols).

To render the curcumin pH-stable according to the invention, the curcumin is prepared into a dry powder containing at least an acid which is physically combined with the curcumin (e.g. by codrying). The acid must be present in an amount effective to maintain the curcumin at a pH of less than 6. Where this result is achieved, the curcumin will retain its ability to impart a yellow coloration upon the addition of water or other aqueous liquid. According to the more preferred embodiments of the invention, the pH will be controlled to a level within the range of from 2.5 to 5.5, and optimally within the range of from 3.5 to 4.5.

Throughout this disclosure, various dry materials will be described as having particular pH values, as is customary and well understood by those skilled in the art. The pH of a dry material is defined herein in the usual manner known to the art, as being the pH at 25° C. of a solution prepared by adding an amount of the dry mix to an equal weight of water and stirring for five minutes.

To obtain the desired pH value in the dry colorant powder according to the invention, an acid can be employed alone or in combination with a suitable buffering salt. The need for a buffering salt and the levels of it and the acid will depend upon the nature of these materials as well as the pH environment of the intended use. Among the suitable acids are strong acids as well as weak acids, such as the usual food grade organic or inorganic acids. Preferably, the acid will comprise a member selected from the group consisting of citric acid, ascorbic acid, malic acid, maleic acid, tartaric acid, fumaric acid, adipic acid and phosphoric acid. Typically it will be advantageous to have an acid which dissolves fairly rapidly so that no problems in processing are encountered, but also the acid will preferably be normally crystalline and relatively non-hygroscopic. The buffer salt, when employed, will typically be the salt of a strong acid and a weak base. Preferably, the buffer will be the sodium or potassium salt of the acid employed, such as sodium citrate, sodium tartrate, sodium phosphate etc.

The objects of the invention are achieved where the acid, with or without a buffer salt, are capable in a dry powder form of maintaining the pH of curcumin at a pH below 6 under the intended conditions of storage. Where the pH of the dry food mix to which the colorant is to be added is high (pH above 6), or where the colorant is intended for use as a colorant of general utility, it is preferred to provide the curcumin with good physical protection. Preferably, the colorant powder will be a codried, intimate mixture of the materials. Since the acid with or without a buffer salt is generally not capable of encapsulating the curcumin as an excessive amount of acid would be required, a watersoluble film-forming encapsulant is preferably employed to coat the curcumin and acid. The filmforming encapsulant protects the curcumin from the immediate environment thus improving the stability of the color, as well as rendering the curcumin dry and flowable.

To prepare the codried intimate mixture, the water soluble components are dissolved in water and the curcumin is dispersed therein. The resulting dispersion or emulsion will have a continuous phase containing the film-former and a discontinuous phase containing the curcumin. Homogenization may be desireable to yield a homogeneous dispersion. The curcumin can be in any of its various forms and can have additives as desired. The dispersion or emulsion can be dried by any suitable means, such as drum drying, tray drying, spray drying or the like. The preferred method of drying is by spray drying under conditions generally well recognized in the art. While not critical, the solids content of the dispersion should be within the range of from b 20 to 60% and will preferably amount to from 30 to 50%, based on the total weight of the dispersion. The colorant should be dried to a moisture content of less than 10%, and preferably less than 5%, to obtain the best stability.

The film-forming encapsulant can be any of those materials known to the art which are capable of forming a coating (preferably encapsulating or complete surrounding) around a dispersed hydrophobic material and then redispersing the hydrophobic material in water. Among these are gelatins, gums, cellulose derivatives, proteins, starch derivatives, and the like. Preferably, the film-forming encapsulant will comprise a member selected from the group consisting of: microcrystalline cellulose, carrageenan, guar gum, alginates, xanthan gum, methyl cellulose, carboxymethyl cellulose, ethyl cellulose, hydroxypropyl cellulose, gum arabic, dextrins, malto dextrins, cold water soluble starches, modified starches, corn syrup solids, high fructose corn syrup solids, gelatin, agar agar, locust bean gum, oil seed protein isolates, pectin, sorbitol, mannitol, sucrose, fructose, acidified versions of the above and combinations thereof. Among these, the dextrins, malto dextrins, cold water soluble starches, modified starches, corn syrup solids, gum arabic and gelatin are presently considered most advantageous. Tests to date show that the most preferred encapsulant is a modified food starch made from waxy maize and having a pH of about 3. The more hygroscopic materials such as corn syrup solids can be employed but require greater care in drying and packaging.

The use of a dispersant or emulsifier is useful in many situations to form a good dispersion or emulsion prior to drying and after redispersing the dry powder in water. The term dispersant will be used herein to denote materials which aid in dispersing or emulsifying the curcumins in solid or liquid form. Any of the dispersants known to the art can be employed for their known activity. Some commercial forms of curcumin are sold with a dispersant. Among the suitable dispersants are materials selected from the group consisting of polyglycerol esters of fatty acids; polysorbate 60, also known as polyoxyethylene (20) sorbitan monostearate; polysorbate 80, also known as polyoxyethylene (20) sorbitan monooleate; polysorbate 65, also known as polyoxyethylene (20) sorbitan tristearate; propylene glycol; lecithin; dioctyl sodium sulfosuccinate; vegetable oil and vegetable oil fractions such as mono- and di glycerides; and the like. This list is not meant to be exhaustive as the art is well aware of dispersants suitable for this purpose.

There are no numerical ranges of universal application for either the amount of water-soluble film-forming encapsulant or the dispersant, as these will depend upon the specific materials, processing conditions and end use requirements. As typical of the broad range, however, the encapsulant will typically be present in an amount within the range of from 50 to 99% based on the total dry weight of the colorant. More preferably, the encapsulant will be present in an amount within the range of from 65 to 85%. The dispersant will typically be present at a weight ratio to the curcumin (pure curcumin basis) within the range of from 1:2 to 50:1, and preferably from 5:1 to 15:1.

The colorant of the present invention can be used in dry food mixes of virtually any pH. Typically this will range from as low as about 2 to as high as about 12. The greatest utility of the invention is found in the area of food mixes having pH values above 6, and particularly above 7.5. These products will rapidly destabilize the curcumin, making it critical to protect the immediate environment of the curcumin according to the invention.

Among the specific dry food mixes where the colorant of the invention is advantageous, are instant pudding mixes of the types disclosed in U.S. Pat. No. 2,801,924 to Clausi et al and U.S. Pat. No. 2,901,355 to Bangert et al which contain, in addition to the pudding starch and sugar, alkali pyrophosphates and alkali orthophosphates to control the setting of the mixes which are mixed with cold milk to form the final pudding food product. The disclosures of these patents are specifically incorporated herein by reference for their disclosures of representative dry instant pudding mixes.

The best stability of the colorant is achieved when the initial moisture content of the food product is low, say below 10% and preferably below 5% and is kept low by suitable packaging materials. An advantage of the colorant stabilized according to the present invention is that it is relatively stable to heat and moisture, as well as increased stability to air and light, and the packaging quality requirements are not stringent. However, it is preferred to use packaging effective to preserve product quality for at least one year. Typical of the suitable packaging materials are: laminates of aluminum foil and polyethylene, films of polyvinylchloride and polyvinylidine chloride polymers and copolymers, and laminates of paper and a polymer film. The stability of the colorant should be that when packaged and under ambient conditions the colorant is stable (no excessive fading) for at least one year, and under accelerated storage (95° F. and 75°% RH) the colorant is stable for at least three months.

BEST MODE FOR CARRYING OUT THE INVENTION

The following Examples are provided to illustrate and explain what is presently considered the best mode for carrying out the invention. The data is for illustrative purposes to guide the person of ordinary skill in the art and is not to be taken as limiting in any regard. Unless otherwise indicated, all parts and percentages are by weight.

EXAMPLE 1

A dry yellow colorant according to the present invention is prepared by forming a dispersion of curcumin and spray drying.

The dispersion contains the following materials:

| Ingredient | Parts by Weight |
| --- | --- |
| Turmeric Oleoresin (35.5% curcumin) | 24 |
| Modified Waxy Maize Starch | 760 |
| Polysorbate 60 | 216 |
| Citric Acid | 25 |
| Sodium Citrate | 25 |

-continued

| Ingredient | Parts by Weight |
| --- | --- |
| Water | 1500 |

These materials were blended to yield a homogeneous mixture and then spray dried. The spray drier was operated at an inlet air temperature of 195° C. and an outlet air temperature of 98° C. The moisture content of the dry powder was 3% and the product had a pH of 4 when added to an equal weight of water at 25° C.

EXAMPLE 2

This example illustrates the preparation of an improved dry food mix according to the invention.

To prepare the dry food mix, the following materials are dry blended:

| Ingredient | Parts by Weight |
| --- | --- |
| Sucrose | 85 |
| Pregelatinized Tapioca Starch | 16 |
| Vanilla Flavor | .3 |
| Tetrasodium Pyrophosphate | 1.8 |
| Disodium Phosphate | 1.8 |
| Yellow 6 | .002 |
| Colorant produced in Example 1 | .5 |

The resulting dry blend has a moisture content of 4% and a pH of 9 when measured as in Example 1. To test the performance of the mix, about 100 grams of it were added to 488 grams of whole milk at 10° C. The pudding set up well, being unaffected by the acid added to the colorant, and showed a pleasing yellow coloration reminiscent of the best quality home-made vanilla pudding. The dry pudding mix possessed a color with exceptional resistance to fading under storage conditions.

EXAMPLE 3

To show the improvement obtained according to the invention, a control product was prepared in the same manner as set forth in Example 1 except that the acid and buffer were deleted. This control product was then prepared into a dry pudding mix in the same manner as set forth in Example 2. The two products were then packaged both in paper/polyethylene laminate and Saran polyvinylidene chloride film. Accelerated storage testing showed the following after 16.5 weeks under the indicated conditions:

| Colorant Sample | Package | RESULTS | | |
| --- | --- | --- | --- | --- |
| | | 4.4° C./50% RH | 35° C./75% RH | 43° C./50% RH |
| Example 1 | Paper/poly | good color | good color, slight orange | good color, similar to 4.4° C. |
| | Saran | good color | good color, slightly better than above | good color, similar to 4.4° C. |
| Control | Paper/poly | good color | unacceptable, brown | acceptable, slight fading |
| | Saran | good color | unacceptable, brown | acceptable, slight fading |

Accelerated storage tests at 12 weeks were conducted with the two products packaged in paper/polyethylene laminate resulting in the following observations and evaluated with a Hunter Coloriminter by placing a one inch deep sample over the colormeter porthole then reading the L a b values at the appropriate voltage:

| Conditions: | Example 2 | Control |
|---|---|---|
| Initial | L 79.5 | 79.9 |
| Readings | a —.6 | —.8 |
| 0 weeks | b 34.3 | 33.9 |
| 12 weeks at | L 79.2 | 78.8 |
| 4.4° C. and | a —.5 | —.1 |
| 50% RH | b 33.3 | 33.0 |
| | good color | good color |
| 12 weeks at | L 78.0 | 76.4 |
| 35° C. and | a .2 | 3.6 |
| 75% RH | b 31.7 | 24.4 |
| | slight fading compared to 0 weeks, acceptable | unacceptable, substantial fading and orange-brownish color |
| 12 weeks at | L 78.9 | 79.0 |
| 43° C. and | a —.1 | +.7 |
| 50% RH | b 33.2 | 30.7 |
| | good color | slight fading compared to 0 weeks, acceptable |

The above storage tests demonstrate the increased stability under storage conditions obtained by adding an acid to adjust the pH of the curcumin color to below 6.

EXAMPLE 4

The procedure of Example 1 was repeated but employing the following formulation:

| Ingredient | Parts by Weight |
|---|---|
| Turmeric (35.5% curcumin) | 24 |
| 10 DE Malto Dextrin | 760 |
| Polysorbate 60 | 216 |
| Citric Acid | 25 |
| Sodium Citrate | 25 |
| Water | 1500 |

The product was again acceptable and showed improved stability and resistance to fading under storage conditions over a control product not containing the acid or buffer.

The above description has been for the purpose of teaching a person skilled in the art how to practice the invention. It is not intended to describe in detail each and every modification and variation of the invention which will become apparent to those skilled in the art upon study. It is applicant's intention, however, that all such modifications and variations be included within the scope of the invention as defined by the following claims.

What is claimed

1. A dry stabilized yellow colorant compatible with alkaline and acid dry food mixes which comprises: a curcumin codried with an amount of an acid effective to maintain the curcumin at a pH at less than 6.

2. A stabilized yellow colorant according to claim 1 wherein the powder is an intimate mixture comprising the curcumin, the acid and a watersoluble film-forming encapsulant which coats the curcumin and acid.

3. A stabilized yellow colorant according to claim 2 wherein the water-soluble film-forming encapsulant comprises a member selected from the group consisting of micro crystalline cellulose, carrageenan, guar gum, alginates, xanthan gum, methyl cellulose, carboxymethyl cellulose, ethyl cellulose, hydroxypropyl cellulose, gum arabic, dextrins, malto dextrins, cold water soluble starches, modified starches, corn syrup solids, high fructose corn syrup solids, gelatin, agar agar, locust bean gum, oil seed protein isolates, pectin, sorbitol, mannitol, sucrose, fructose, acid versions thereof and combinations thereof.

4. A stabilized yellow colorant according to claim 3 wherein the water-soluble film-forming encapsulant comprises at least one member selected from the group consisting of dextrins, malto dextrins, cold water soluble starches, modified starches, corn syrup solids, gum arabic, and gelatin.

5. A stabilized yellow colorant according to claim 2 which further includes a buffer to maintain a pH of less than 6.

6. A stabilized yellow colorant according to claim 5 wherein the acid comprises a member selected from the group consisting of citric acid, ascorbic acid, malic acid, maleic acid, fumaric acid, tartaric acid, adipic acid, and phosphoric acid, and the buffer comprises a sodium or potassium salt of any of the above acids.

7. A stabilized yellow colorant according to claims 1 or 2 wherein the curcumin is present in the form of dried turmeric.

8. A stabilized yellow colorant according to claims 1 or 2 wherein the curcumin is present in the form of oleoresin turmeric.

9. A stabilized yellow colorant according to claim 2 which further comprises a dispersant in an amount effective to maintain the curcumin in a stable dispersion when the dry colorant powder is dispersed in an aqueous medium.

10. A stabilized yellow colorant according to claim 9 wherein the dispersant comprises a member selected from the group consisting of polyglycerol esters of fatty acids, polyoxyethylene (20) sorbitan monostearate, polyoxyethylene sorbitan (20) monooleate, polyoxyethylene (20) sorbitan tristearate, propylene glycol, lecithin, dioctyl sodium sulfosuccinate, vegetable oil and vegetable oil fractions.

11. A stabilized yellow colorant according to claim 5 wherein the curcumin is present in the form of oleoresin turmeric.

12. A stabilized yellow colorant according to claim 11 wherein the water-soluble film-forming encapsulant forms a continuous matrix surrounding the oleoresin turmeric which forms a dispersed phase, and wherein the water-soluble film-forming encapsulant comprises modified food starch made from waxy maize.

13. A stabilized yellow colorant according to claim 12 wherein the acid comprises citric acid and the buffer comprises sodium citrate.

14. A stabilized yellow colorant according to claim 5 wherein the acid and buffer are present in amounts effective to maintain the pH of the dry powder within the range of from 2.5 to 5.5.

15. A stabilized yellow colorant according to claim 14 wherein the pH of the dry powder is maintained within the range of from about 3.5 to about b 4.5.

16. An improved dry food mix with a pH of greater than 6 which comprises a colorant and dry ingredients and is adapted for storage for long periods of time in dry form and then mixing with an aqueous liquid in the preparation of a colored food product, wherein the improvement comprises: a stabilized yellow colorant in dry powder form which contains a curcumin codried with an amount of an acid effective to maintain the curcumin at a pH of less than 6.

17. An improved dry food mix according to claim 16 wherein the dry food mix has a pH greater than 7.5.

18. An improved dry food mix according to claim 17 wherein the colorant powder is an intimate mixture comprising curcumin, the acid and a watersoluble film-forming encapsulant which coats the curcumin and acid.

19. An improved dry food mix according to claim 18 wherein the colorant further includes a buffer to maintain a pH of less than 6.

20. An improved dry food mix according to claim 18 wherein the curcumin is present in the form of dried turmeric.

21. An improved dry food mix according to claim 18 wherein the curcumin is present in the form of oleoresin turmeric.

22. An improved dry food mix according to claim 19 wherein the colorant further comprises a dispersant in an amount effective to maintain the curcumin in a stable dispersion when the dry colorant powder is dispersed in an aqueous medium.

23. An improved dry food mix according to claim 22 wherein the powder is a codried intimate mixture comprising the curcumin, the acid, the buffer, the water-soluble film-forming encapsulant, and the dispersant in an amount effective to maintain the curcumin in a stable dispersion when the dry colorant powder is dispersed in an aqueous medium.

24. An improved dry food mix according to claim 23 wherein the water-soluble film-forming encapsulant forms a continuous matrix surrounding the oleoresin turmeric which forms a dispersed phase, and wherein the water-soluble film-forming encapsulant comprises modified food starch made from waxy maize.

25. An improved dry food mix according to claim 24 wherein the acid comprises citric acid and the buffer comprises sodium citrate.

26. An improved dry food mix according to claim 19 wherein the acid and the buffer are present in amounts effective to maintain the pH of the dry colorant powder within the range of from 2.5 to 5.5.

27. An improved dry food mix according to claim 25 wherein th pH of the dry colorant powder is maintained within the range of from about 3.5 to about 4.5.

28. An improved dry food mix according to claim 26 wherein the dry food mix comprises starch and flavors and is adapted for use in preparing a pudding.

29. An improved dry food mix according to claim 28 which is adapted for preparing a pudding by admixture with cold milk, wherein the starch comprises dry gelatinized starch, and the dry mix further comprises an alkali pyrophosphate and an alkali orthophosphate.

30. An improved method for preparing a dry curcumin colorant by dispersing curcumin in an aqueous film-forming solution and drying the solution, wherein the improvement comprises: adding an amount of an acid to the solution to reduce the pH thereof to below 6, to thereby render the colorant stable to dry food mixes of any pH.

31. An improved method according to claim 30 wherein a buffer is also added to the solution to maintain the pH below 6.

32. An improved method according to claim 31 wherein the pH of the solution is reduced to within the range of from 2.5 to 5.5.

33. An improved method according to claim 32 wherein the pH of the solution is reduced to within the range of from about 3.5 to about 4.5.

34. An improved method according to claim 32 wherein the solution is spray dried.

* * * * *